United States Patent
Clark et al.

(10) Patent No.: US 6,428,134 B1
(45) Date of Patent: Aug. 6, 2002

(54) PRINTER AND METHOD ADAPTED TO REDUCE VARIABILITY IN EJECTED INK DROPLET VOLUME

(75) Inventors: David L. Clark, Pittsford; Xin Wen, Rochester, both of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,037

(22) Filed: Jun. 12, 1998

(51) Int. Cl.⁷ .............................. B41J 29/38; B41J 2/205
(52) U.S. Cl. ................................ 347/10; 347/14; 347/5; 347/11; 347/15
(58) Field of Search ................................ 347/10, 9, 11, 347/12, 14, 5, 15

(56) References Cited

U.S. PATENT DOCUMENTS

| | | | |
|---|---|---|---|
| 4,322,732 A | * 3/1982 | Furukawa et al. | 347/10 |
| 4,353,079 A | 10/1982 | Kawanabe | |
| 5,038,208 A | 8/1991 | Ichikawa et al. | |
| 5,321,427 A | * 6/1994 | Agar et al. | 347/10 |
| 5,462,142 A | 10/1995 | Handke et al. | |
| 5,557,304 A | * 9/1996 | Stortz | 347/11 |

FOREIGN PATENT DOCUMENTS

| | | |
|---|---|---|
| EP | 0 605 216 A2 | 7/1994 |
| EP | 0 893 258 A2 | 1/1999 |
| WO | WO 98/08687 | 3/1998 |

OTHER PUBLICATIONS

U.S. Patent application No. 08/899,574 filed Jul. 24, 1997, entitled "Digital Ink Jet Printing Apparatus and Method".
U.S. Patent application No. 08/826,353 filed Mar. 26, 1997, entitled "Calibration and Control Method for Improving Printing Uniformity of an Ink Jet Head".
U.S. Patent application No. 09/004,791, filed Jan. 9, 1998, entitled "Ink Jet Printing Apparatus and Method for Improved Accuracy of Ink Droplet Placement".

* cited by examiner

*Primary Examiner*—John Barlow
*Assistant Examiner*—Charles W. Stewart, Jr.
(74) *Attorney, Agent, or Firm*—Norman Rushefsky

(57) ABSTRACT

Printer and method adapted to reduce variability in ejected ink drop volume. A print head includes a plurality of nozzles integrally attached to the print head, each nozzle being capable of ejecting an ink droplet therefrom. At least one of the nozzles has an undesirable characteristic producing ink droplets of non-nominal volume. A waveform generator is connected to the nozzles for generating a plurality of waveforms to be supplied to the nozzles, so that the nozzles eject the ink droplets in response to the waveforms supplied thereto. Each waveforms has a plurality of pulses controlling ink droplet volume. A controller is provided for controlling the waveforms supplied to the nozzles and for transmitting the waveforms to the nozzles in order to eject the ink droplets so as to compensate for the non-nominal volume by controlling the number of pulses in the waveform. In this manner, all nozzles produce ink droplets of nominal volume regardless of physical or electrical variations between nozzles.

17 Claims, 4 Drawing Sheets

| INK DROP VOLUME ($V_i$) | NUMBER OF PULSES 1th NOZZLE | NUMBER OF PULSES 2nd NOZZLE | — — — — — — | NUMBER OF PULSES Mth NOZZLE |
|---|---|---|---|---|
| $V_1$ | $n_{11}$ | $n_{12}$ | | $n_{1M}$ |
| $V_2$ | $n_{21}$ | $n_{22}$ | | $n_{2M}$ |
| $V_3$ | $n_{31}$ | $n_{32}$ | | $n_{3M}$ |
| $V_4$ | $n_{41}$ | $n_{42}$ | | $n_{4M}$ |
| ⋮ | ⋮ | ⋮ | ⋮ | ⋮ |
| $V_N$ | $n_{N1}$ | $n_{N2}$ | | $n_{NM}$ |

PRINTER AND METHOD ADAPTED TO REDUCE VARIABILITY IN EJECTED INK DROPLET VOLUME

BACKGROUND OF THE INVENTION

The present invention generally relates to printer apparatus and methods and more particularly relates to a printer and method adapted to reduce variability in ejected ink drop volume caused by variability in physical characteristics of ink nozzles belonging to the printer.

An ink jet printer produces images on a receiver medium by ejecting ink droplets onto the receiver medium in an image-wise fashion. The advantages of non-impact, low-noise, low energy use, and low cost operation in addition to the capability of the printer to print on plain paper are largely responsible for the wide acceptance of ink jet printers in the marketplace.

However, ink jet printers can produce undesirable image defects in the printed image. One such image defect is non-uniform print density, such as "banding" and "streaking". "Banding" and "streaking" are caused by variabilities in volumes of the ink droplets ejected from different ink nozzles. Such variabilities in ink volume can be in turn caused by variabilities between nozzles. That is, variabilities between nozzles may be caused by variability in the physical characteristics (e.g. the nozzle diameter, the channel width or length, etc.) or the electrical characteristics (e.g., thermal or mechanical activation power, etc.) of the nozzles. These variabilities are often introduced during print head manufacture and assembly.

Hence, ink dots placed by individual nozzles in the print head can be different, producing variation between rows of ink dots printed on the receiver medium. These differences are evinced by variations in the density, size, or morphology of the ink dots placed on the receiver medium by the nozzles. These variations can have a static (i.e., consistent) component and a random (i.e., non-consistent) component. Random variations between ink dots are generally less visible because their effects tend to cancel-out each other. However, static variations between ink dots placed by individual nozzles are usually more visible, thus producing "banding" and "streaking" image defects, which is undesirable.

An "averaging" technique is often used to reduce visual effects of the ink drop volume variability. That is, each image row in the printed image on the ink receiver is printed by different ink nozzles in separate printing passes. If ink volume variability between the ink nozzles is not correlated, their visual effects tend to cancel each other and are therefore reduced. The disadvantages of this technique are first, the productivity is reduced by increasing the number of printing passes; and second, although this technique can decrease the amplitude and increase the frequency of the banding artifacts, this technique cannot completely eliminate the visual effects of ink volume variation.

Techniques addressing non-uniform print density in ink jet printing are known. These techniques are generally directed to "bi-modal" ink jet printing apparatus wherein an ink nozzle can eject either no ink droplet or an ink droplet of a fixed volume. One such technique relies on the control of ink volume by changing the activation voltage width of an electric signal supplied to the print head for activating ink ejection. This technique is limited in that bubble formation occurs to cause ink droplet ejection, which bubble formation complicates formation of desired ink drop volume.

Another bi-modal ink jet printing technique is disclosed in U.S. Pat. No. 5,038,208 titled "Image Forming Apparatus With A Function For Correcting Recording Density Unevenness" issued Aug. 6, 1991 in the name of Hiroyuki Ichikawa, et al. This technique relies on varying a halftoning pattern of a group of ink dots in the printed image in order to correct ink drop volume variations. This second technique is, however, time consuming because it requires intense image processing for each input image file. In addition, this technique is also limited to bi-modal ink jet printing.

Therefore, there has been a long-felt need to provide a printer and method adapted to reduce variability in ejected ink drop volume caused by variability in physical characteristics of ink nozzles belonging to the printer.

SUMMARY OF THE INVENTION

An object of the present invention is to provide a printer capable of reducing printing variabilities between ink nozzles during multiple tone ink jet printing.

With this object in view, the present invention resides in a printer, comprising a print head having a plurality of ink chambers therein capable of ejecting a plurality of ink droplets therefrom, at least one of the chambers having undesirable characteristics that produce ink droplets of non-nominal volume; and a controller connected to said ink chambers for transmitting electronic waveforms to the ink chambers to eject the ink droplets so as to compensate for non-nominal volume, so that at least one chamber produces ink droplets of nominal volume.

According to one embodiment of the present invention, a print head includes a plurality of nozzles integrally attached to the print head, each nozzle being capable of ejecting an ink droplet therefrom. At least one of the nozzles has undesirable characteristics producing ink droplets of non-nominal volume. A waveform generator is connected to the nozzles for generating a plurality of waveforms to be supplied to the nozzles, so that the nozzles eject the ink droplets in response to the waveforms supplied thereto. Each waveform has a plurality of pulses controlling ink droplet volume. A look-up table is connected to the nozzles for storing values of number of pulses to be supplied to each nozzle. A calibrator in communication with the look-up table is provided for converting the pixel values describing each pixel of an input image file to a calibrated image file. An image halftoning unit is connected to the image calibrator for halftoning the calibrated image file to generate a half-toned image file having a plurality of pixel values. A nozzle selector interconnects the waveform generator and the print head for selecting predetermined ones of the nozzles for activation. Moreover, a controller is connected to the image halftoning unit and the nozzle selector for controlling the waveforms supplied to the nozzles in order to eject the ink droplets in a manner that compensates for the non-nominal volume by controlling the number of pulses in the waveform. In this manner, at least one chamber produces ink droplets of nominal volume. In addition, a piezoelectric electromechanical transducer is disposed in at least one of the nozzles, the transducer being responsive to the waveforms for ejecting the ink droplet from the at least one nozzle.

An advantage of the present invention is that ink drop volume variability between nozzles is compensated, so that ink drops ejected from each ink nozzle is substantially identical regardless of the physical or electrical characteristics of the nozzle.

Another advantage of the present invention is that calculation for compensating ink drop volume variation between nozzles can be made efficiently using a look-up table.

A further advantage of the present invention is that quality images nonetheless can be produced by ink jet print heads having manufacturing variabilities. In other words, robustness of a multiple-tone inkjet printer is improved.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing-out and distinctly claiming the subject matter of the present invention, it is believed the invention will be better understood from the following description when taken in conjunction with the accompanying drawings wherein:

DESCRIPTION OF PREFERRED EMBODIMENTS OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1A:
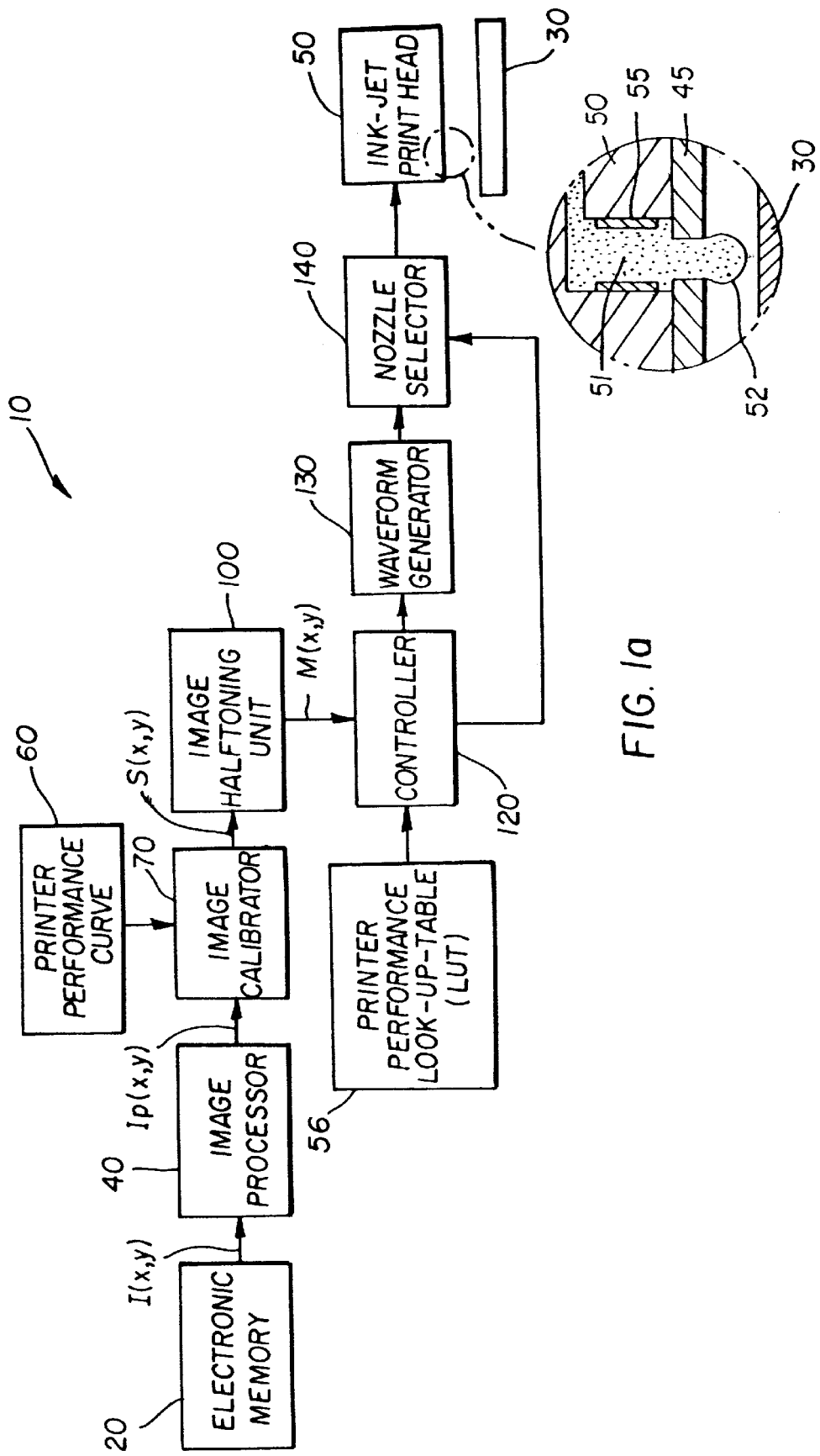
FIG. 1a shows a first embodiment system functional diagram belonging to the present invention, the system functional diagram including a printer performance LUT (Look-Up Table) and a printer performance curve and also including an electromechanical transducer associated with an ink nozzle to eject an ink droplet therefrom.
Figure 1B:
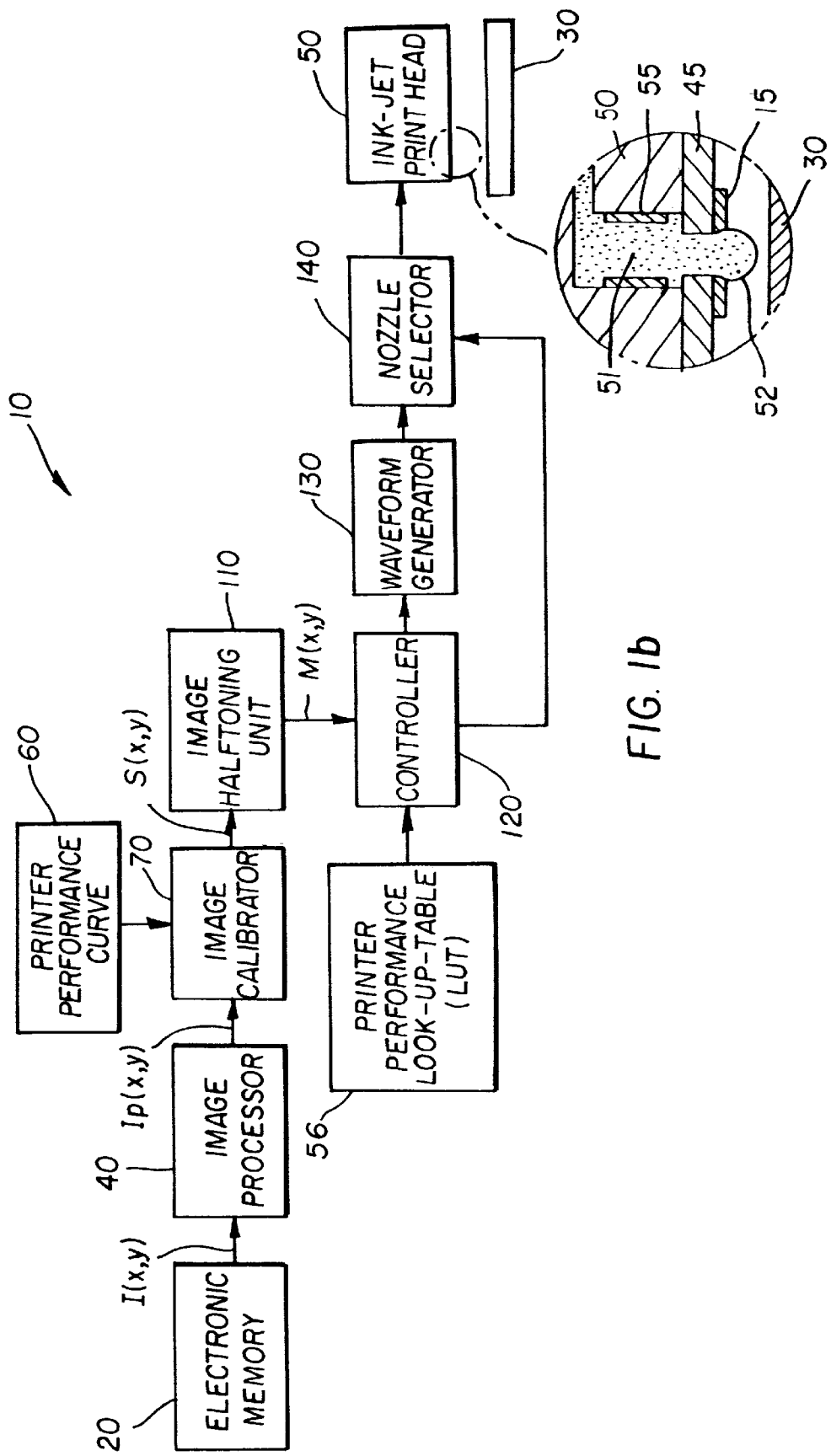
FIG. 1b shows a second embodiment system functional diagram belonging to the present invention, the system functional diagram including the printer performance LUT and the printer performance curve and also including a heat generating element associated with the ink nozzle.

Therefore, referring to FIGS. 1a and 1b, there is shown a first embodiment printer and a second embodiment printer, respectively, both printers being generally referred to as 10. The difference between the first and second embodiment printers is that the second embodiment printer includes a heater element 15 for reasons disclosed hereinbelow. Each printer 10 includes an electronic memory 20 having a digital input image file I(x,y) stored therein. With respect to image file I(x,y), the letters "x" and "y" designate column and row numbers, respectively, the combination of which define pixel locations in an input image plane (not shown). More specifically, a plurality of color pixels with a color pixel value at each "x" and "y" location will preferably correspond to pixels having desired color densities when printed on a receiver medium 30. Image file I(x,y) may be generated by a computer or, alternatively, provided as an input generated from a magnetic disk, a compact disk, a memory card, a magnetic tape, a digital camera, a print scanner, a film scanner, or the like. Moreover, image file I(x,y) may be provided in any suitable format well known in the art, such as page-description language or bitmap format.

Still referring to FIGS. 1a and 1b, electrically connected to electronic memory 20 is an image processor 40, which processes image file I(x,y) by performing any one of several desired operations on image file I(x,y). These operations, for example, may be decoding, decompression, rotation, resizing, coordinate transformation, mirror-image transformation, tone scale adjustment, color management, in addition to other desired operations. Image processor 40 in turn generates an output image file $I_p(x,y)$, which includes a plurality of pixel values having color code values, the pixel values respectively corresponding to a plurality of ink delivery nozzles 45 (only one of which is shown) integrally connected to a piezoelectric ink jet print head 56. Each nozzle 45 defines an ink chamber 51 therein for ejecting an ink droplet 52 therefrom. Each ink chamber 51 in turn has a chamber outlet 53 and an open side 54. For reasons disclosed in detail hereinbelow, an electromechanical transducer 55, such as a piezoelectric transducer made of lead zirconium titanate (PZT), is disposed in communication with ink chamber 51. Moreover, the previously mentioned heater 15 may surround outlet 53 for reducing surface tension of ink droplet 52 by supplying heat thereto, so that ink droplet 52 can be more easily ejected from nozzle 45.

Figures 2, 4:
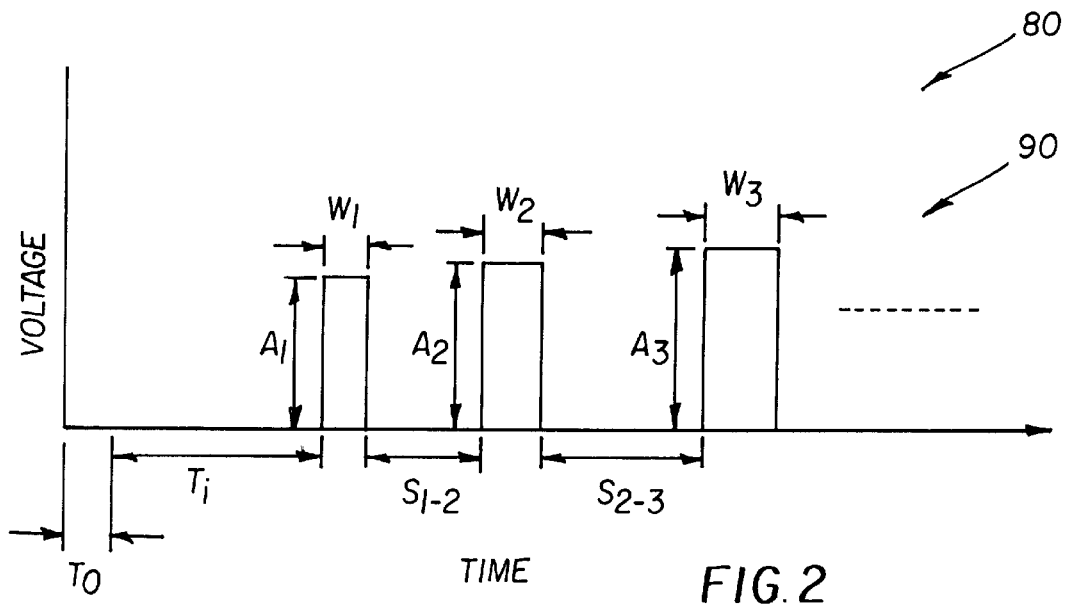
FIG. 2 is a graph illustrating an electronic waveform comprising a plurality of voltage pulses, the waveform being defined by a plurality of predetermined parameters including printing start time, number of pulses, pulse amplitude, pulse width, and delay time intervals between pulses.
FIG. 4 shows an enlargement of the LUT of FIGS. 1a and 1b.
Figure 3:
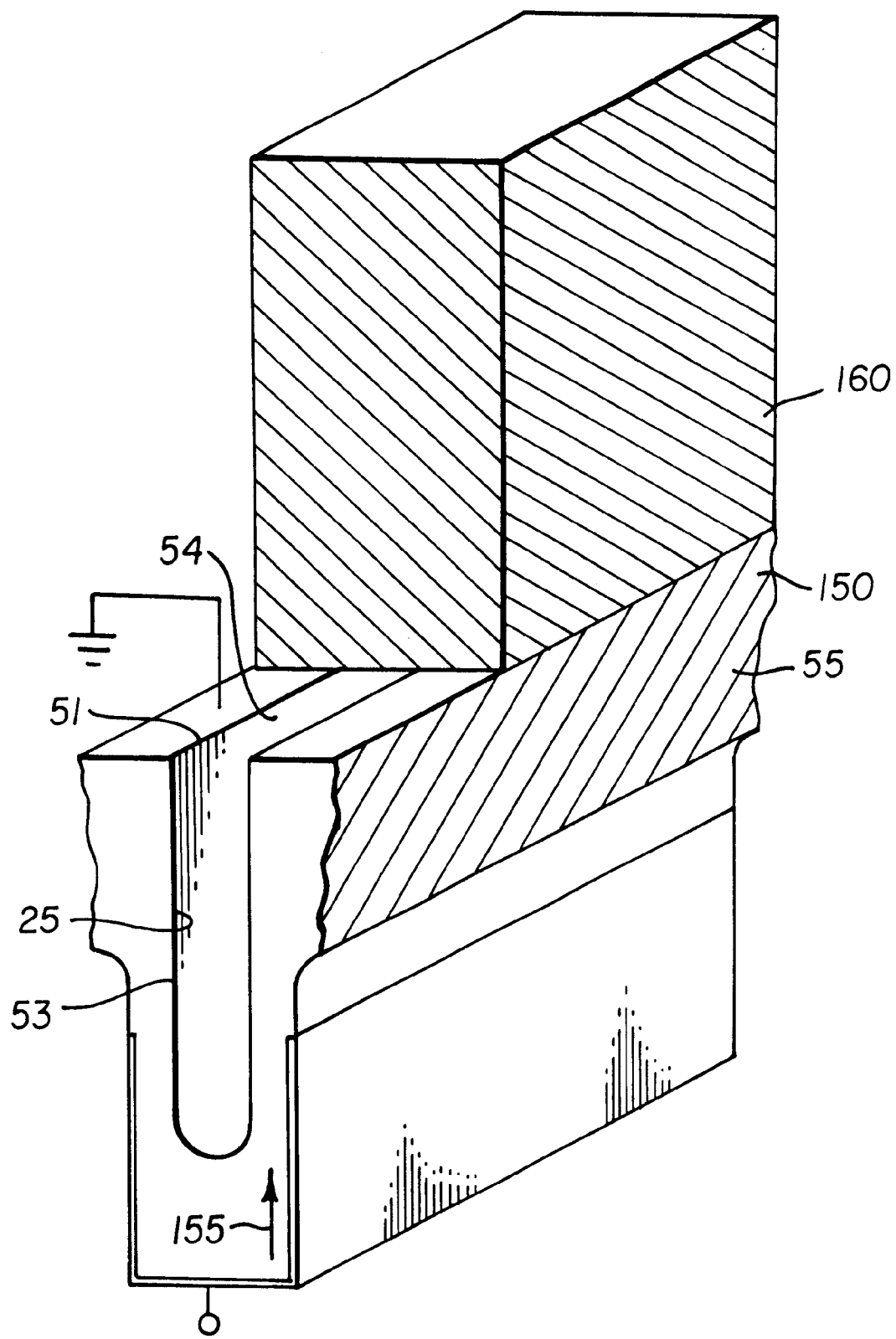
FIG. 3 is a fragmentation view in perspective of one of the ink channels in accordance with the present invention.

Referring to FIGS. 1a, 1b and 2, data related to performance of printer 10 are stored in an LUT (Printer Performance Look-Up Table) 56 and a printer performance curve 60. In this regard, the previously mentioned image file $I_p(x,y)$ is calibrated in an image calibrator 70 which converts the color pixel values at each pixel to a new set of pixel values. Printer performance LUT 56 assists in calibration of image file $I_p(x,y)$. In a preferred embodiment of the invention, LUT 56 provides an electronic waveform, generally referred to as 80, comprising a group of "square" pulses, generally referred to as 90 (only three of which are shown), for driving piezoelectric print head 50. Electronic waveform 80 is characterized by the number of pulses, pulse widths (i.e., $W_1, W_2, W_3 \ldots$), voltage pulse amplitudes (i.e., $A_1, A_2, A_3 \ldots$), and delay time intervals (i.e., $S_{1-2}, S_{2-3} \ldots$) between pulses 90. Predetermined values of number of pulses, pulse amplitudes, widths and delay time intervals between pulses are selected depending on a desired mode of operation of print head 50. For example, a desired mode of operation for a piezoelectric ink jet print head 50 may be that frequencies of pulses 90 are reinforced by the resonance frequencies of ink chamber 46, which is associated with each ink nozzle 45, so that energy used for ink ejection is minimized. Predetermining the values of the number of pulses, pulse amplitude, pulse width and time delay between pulses results in discrete ink droplet volumes that are modulatable by electronic waveform 80.

Referring again to FIGS. 1a and 1b, an image halftoning unit 100 is used to minimize undesirable artifacts (e.g., contouring and noise) in the printed image. As used herein, the terminology "image halftoning" refers to the image processing technique which creates the appearance of intermediate tones by the spatial modulation of two tones, for example, black and white, or multiple levels of tones, such as black, white and gray levels. Halftoning improves image quality by minimizing image artifacts such as contouring and noise, both of which result from printing with a finite number of tone levels. In cases where multiple levels of tones are necessary, "image halftoning" is often referred to as "multiple level halftoning", or simply multi-toning. In the preferred embodiment of the invention, the term image halftoning includes bi-level halftoning, as well.

As shown in FIGS. 1a and 1b, calibrated image file S(x,y), which comprises a plurality of pixels values for each color, is input to image halftoning unit 100, which produces a multitoned image file M(x,y). In this regard, image halftoning unit 100 itself includes a suitable halftoning error diffusion algorithm to accomplish halftoning. Alternatively, any of a number of halftoning algorithms well known in the art can be used, such as multilevel ordered dither or multilevel error diffusion. In this manner, input image file S(x,y) is substantially continuous tone data.

Referring again to FIGS. 1a and 1b, halftoned image file M(x,y) is next sent to a controller 120. Controller 120 performs the function of controlling the correct waveforms to be generated in order to obtain corresponding correct pixels. Controller 120 accomplishes this function by requesting that electronic waveform 90 be generated by a waveform generator 130 to lay-down a specific color at a specific pixel. In this regard, the correct nozzle 45 is selected by a nozzle selector 140 connected to waveform generator 130. Waveform generator 130 can include an electronic circuit (not shown) for producing the correct digital waveforms. Moreover, waveform generator 130 can be used in combination with a digital-to-analog converter (not shown), and amplifiers (also not shown) for providing proper waveforms used to actuate electromechanical transducer 55 or thermal resistors (not shown). Transducer 55 in turn ejects droplets 52 from ink nozzles 45. Image-wise activation and ink ejection of ink droplets 52 reproduces the input digital image on receiver medium 30.

Referring to FIG. 2, print head 50 comprises a generally cuboid-shaped preferably one-piece substrate 150 formed of the previously mentioned piezoelectric material (e.g., PZT), which is responsive to electrical stimuli. In the preferred embodiment of the invention, piezoelectric substrate 150 is poled generally in the direction of an arrow 155. Of course, the poling direction may be oriented in other directions, if desired, such as in a direction perpendicular to the poling direction shown by arrow 155. Cut into substrate 150 are the previously mentioned plurality of elongate ink chambers 52. Ink chambers 52 are covered at their outlets 53 by a nozzle plate (not shown) having a plurality of orifices (also not shown) preferably aligned with respective chamber outlets 53, so that ink droplets 52 are ejected from chamber outlets 53 and through the orifices. A rear cover plate (not shown) is also provided for capping the rear of chambers 51. In addition, a top cover plate 200 caps chambers 51 along open sides 54.

Referring now to FIGS. 1a, 1b, 3 and 4, data related to performance of printer 10 are stored in the previously mentioned printer performance LUT (Look-Up Table) 56. Moreover, image file $I_p(x, y)$ is preferably calibrated by means of image calibrator 70. LUT 60 provides electronic waveform 80, which may comprise the plurality of "square" pulses 90, for driving print head 56. In this regard, electronic waveform 80 is characterized by a set of predetermined parameters, which predetermined parameters may be the printing start time $T_i$ (after the start of a print line at time $T_0$), number of pulses, pulse widths (i.e., $W_1, W_2, W_3 \ldots$), voltage pulse amplitudes (i.e., $A_1, A_2, A_3 \ldots$), and delay time intervals (i.e., $S_{1-2}, S_{2-3} \ldots$) between pulses 90. For the piezoelectric print head 56 belonging to the present invention (see FIG. 2), a typical time between successive print lines is in the range of approximately 0.1 ms to 100 ms. A typical pulse amplitude is in the range of approximately 5–35 volt. A typical delay time interval is in the range of approximately 1–1000 μs.

Predetermined values of number of pulses, pulse amplitudes, widths and delay time intervals between pulses are selected according to a desired mode of operating print head 50. For example, a desired mode of operation for piezoelectric ink jet print head 50 may be that frequencies of pulses 90 are reinforced by resonance frequencies of ink chamber 51, so that the amount of energy input to nozzle 45 to cause ink ejection therefrom is minimized. As previously mentioned, predetermining the values of the number of pulses, pulse amplitude, pulse width and delay time intervals between pulses results in discrete ink droplet volumes modulatable by electronic waveform 80.

As best seen in FIG. 4, LUT 56 includes a plurality of ink drop volumes $V_i$ (i=1, ..., N) corresponding to a plurality of electronic waveforms 80. "$V_N$" is defined herein as maximum ink drop volume. Each ink drop volume corresponds to an "optical density" obtained from a test image that is printed by driving nozzles 45 with the same waveform 80. Details of calibrating optical densities using uniform-density test images are provided in commonly assigned U.S. patent application Ser. No. 08/826,353 titled "Imaging Apparatus And Method of Providing Images Of Uniform Print Density" filed Mar. 26, 1997 in the name of Xin Wen, the disclosure of which is hereby incorporated by reference.

Still referring to FIG. 4, it is known that variabilities between ink nozzles can cause ink drop volume from an ink nozzle 45 to be different from the desired ink volume $V_i$. At least one nozzle 45 produces an "non-nominal" volume. That is, at least one nozzle 45 produces ink droplet volumes that do not have nominal values. To compensate for these variations in ink drop volumes between nozzles 45, a different number of pulses $n_{ij}$ is assigned to each jth ink nozzle 45. In this regard, calibration of the number of pulses $nij$ is first obtained by printing the previously mentioned uniform-density test images using the same number of pulses $n_i$. The density variations between ink nozzles 45 are then measured by a densitometer. The correct pulse numbers can then obtained according to the density variations. For an ink nozzle that prints smaller than average ink droplets 52, the number of pulses 90 is increased. Similarly, for an ink nozzle that prints larger than average droplets 52, the number of pulses 90 is decreased. Although only number of pulses is used in printer performance LUT 56 in order to describe the electronic waveform 80, it is understood that other parameters can be included. For example, these other parameters may be printing start time $T_i$ (after the start of the print line at time $T_0$), pulse widths (i.e., $W_1, W_2, W_3 \ldots$), voltage pulse amplitudes (i.e., $A_1, A_2, A_3 \ldots$), and delay time intervals (i.e., $S_{1-2}, S_{2-3}, \ldots$) between pulses 90. It may be appreciated that these parameters are also dependent on the shapes of the electronic waveform 80 used to activate ink chambers 46 in inkjet print head 50. Any one or all of these parameters can be used to compensate for ink drop volume variabilities between ink nozzles 45. It may be further appreciated that these parameters can also be selected to preserve ink droplet placement accuracy on the ink receiver while the ink volume variability is compensated.

An advantage of the present invention is that ink drop volume variability between nozzles is compensated, so that ink drops ejected from each ink nozzle are substantially identical. This result is obtained, for example, by selecting the proper number of pulses to be supplied to the nozzles.

Another advantage of the present invention is that calculation for compensating ink drop volume variation between nozzles can be made efficiently using a look-up table.

A further advantage of the present invention is that quality images can be produced by ink jet print heads having manufacturing variabilities between nozzles. This is so because controlling, for example, number of pulses supplied to each nozzle controls ink droplet volume. Precise control of ink droplet volume produces quality images.

The invention has been described in detail with particular reference to certain preferred embodiments thereof, but it will be understood that variations and modifications can be effected within the spirit and scope of the invention. For example, although the invention is described for use with square wave pulses, other waveforms are usable with the present invention as well. These other waveforms include, for example, triangular, trapezoidal, and sinusoidal waveforms, either in unipolar or bi-polar voltages. As another example, electronic waveform 80 may be fully or partially continuous without one or more delay time intervals ($S_{1-2}$, $S_{2-3}$ . . . ). Such alternative waveforms can be characterized in similar fashion to the example of the square wave 90 disclosed herein. That is, a continuous sinusoidal wave can be characterized by the period and the amplitude of each cycle or each half cycle plus a constant voltage offset.

Moreover, as is evident from the foregoing description, certain other aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

Therefore, what is provided is a printer and method adapted to reduce variability in ejected ink drop volume caused by variability in physical characteristics of ink nozzles belonging to the printer.

PART LIST $A_i$ . . . pulse amplitude
$n_{ij}$ . . . number of pulses for "$j^{th}$" nozzle
$s_i$ . . . delay time between pulses
$t_0$ . . . start time of a print line
$t_i$ . . . printing start time
$V_i$ . . . ink drop volume
$V_N$ . . . maximum ink drop volume
$W_i$ . . . pulse widths
10 . . . printer
20 . . . electronic memory
30 . . . receiver medium
40 . . . image processor
45 . . . nozzle
50 . . . print head
51 . . . ink chamber
52 . . . ink droplet
53 . . . chamber outlet
54 . . . open side of chamber
55 . . . electromechanical transducer
56 . . . printer performance look-up table (LUT)
60 . . . printer performance curve
70 . . . image calibrator
80 . . . electronic waveform
90 . . . square pulses
100 . . . image halftoning unit
120 . . . controller
130 . . . waveform generator
140 . . . nozzle selector
150 . . . substrate
155 . . . arrow
160 . . . top cover plate

What is claimed is:

1. A pinter capable of reducing ink volume variability, comprising:
   (a) a print head;
   (b) at least one nozzle integrally attached to said print head, said nozzle having an ink chamber therein capable of ejecting a plurality of ink droplets therefrom, the chamber producing ink droplets each of a non-nominal volume;
   (c) a waveform generator connected to said nozzle for generating an electronic waveform to be supplied to said nozzle, so that said nozzle ejects the ink droplet in response to the waveform supplied thereto, the waveform being defined by an electronic waveform having a plurality of pulses controlling ink droplet volume;
   (d) a controller connected to said nozzle for transmitting the electronic waveform to said nozzle to eject the ink droplet so as to compensate for the non-nominal volume by controlling the number of pulses in the waveform, so that the at least one chamber produces an ink droplet of nominal volume; and
   (e) a look-up table associated with said nozzle for storing values of number of pulses associated with said nozzle.

2. The apparatus of claim 1, wherein said look-up table has a plurality of pulses defining each waveform.

3. The apparatus of claim 2, further comprising a nozzle selector interconnecting said waveform generator and said print head for selecting said nozzle for activation.

4. The apparatus of claim 1, further comprising an electromechanical transducer disposed in said nozzle and responsive to said waveform for ejecting the ink drop from said nozzle.

5. The apparatus of claim 4, wherein said electromechanical transducer is formed of a piezoelectric material.

6. A printer capable of reducing ink volume variability for gray-scale printing on a receiver medium, comprising:
   (a) a print head;
   (b) a plurality of nozzles integrally attached to said print head, each of said nozzles capable of ejecting an ink droplet therefrom, at least one of the nozzles producing ink droplets each of non-nominal volume;
   (c) a waveform generator connected to said nozzles for generating a plurality of waveforms supplied to said nozzles, so that said nozzles eject the ink droplets in response to the waveforms supplied thereto, each of said waveforms having a plurality of pulses controlling ink droplet volume;
   (d) a look-up table connected to said nozzles for storing values of number of pulses to be supplied to each nozzle;
   (e) a calibrator in communication with said look-up table for converting an input image file having a plurality of pixels to a calibrated image file, the input image file including a plurality of pixel values for each pixel of the input image file;
   (f) an image halftoning unit connected to said image calibrator for halftoning the calibrated image file to generate a halftoned image file having the plurality of pixel values;
   (g) a nozzle selector interconnecting said waveform generator and said print head for selecting predetermined ones of said nozzles for actuation;
   (h) a controller connected to said image halftoning unit and said nozzle selector for controlling the waveforms supplied to said nozzles and for transmitting the electronic waveforms to said nozzles to eject the ink droplets by controlling the number of pulses in the respective waveform, so that the at least one chamber produces ink droplets each of nominal volume; and (i) a piezoelectric electromechanical transducer disposed in at least one of said nozzles and responsive to said waveform for ejecting the ink droplet from said nozzle.

7. A method of reducing variability in ejected ink drop volume, comprising the steps of:

(a) providing a print head having
at least one nozzle, the nozzle having an ink chamber therein capable of ejecting ink droplets therefrom, the chamber producing ink droplets each of non-nominal volume;

(b) operating a waveforn generator and generating at electronic waveform supplied to the nozzle, so that the nozzle ejects the ink droplet in response to the waveform supplied thereto, the waveform having a plurality of pulses controlling ink droplet volume;

(c) transmittinig the electronic waveformn to the nozzle to eject the ink droplet by controlling the number of pulses in the waveform, so that the chamber produces ink droplets each of nominal volume; and (d) using a look-up table that stores values of number of pulses to be supplied to the nozzle.

8. The apparatus of claim 7, wherein in the step of using a look-up table the look-up table defines a plurality of pulses for each electronic waveform.

9. The apparatus of claim 8, further comprising the step of selecting the nozzle for activation by using a nozzle selector interconnecting the waveform generator and the nozzle.

10. The apparatus of claim 8, wherein an electromechanical transducer is disposed in the nozzle and responsive to the waveform for ejecting the ink droplet from the nozzle.

11. The apparatus of claim 10, wherein the electromechanical traducer is formed of a piezoelectric material.

12. A method of reducing ink volume variability for gray-scale printing on a receiver medium, comprising the steps of:

(a) providing a print head having
a plurality of nozzles, each of the nozzles capable of ejecting ink droplets therefrom, at least one of the nozzles having been determined to produce ink droplets each of non-nominal volume;

(b) generating a plurality of waveforms supplied to the nozzles, so that the nozzles eject the ink droplets in response to the respective waveforms supplied thereto, each of the waveforms having a plurality of pulses controlling ink droplet volume;

(c) providing a look-up table that stores data values of number of pulses for each nozzle;

(d) using a calibrator in communication with the look-up table to convert an input image file having a plurality of pixels to a calibrated image file, the input image file including pixel value data representing multiple levels of tones greater than two for each pixel of the input image file;

(e) operating upon the calibrated image file to generate a halftoned image file having pixel value data representing multiple levels of tones greater than two for each pixel of the input image file;

(f) selecting the nozzles for activations;

(g) using the halftoned image file and the data values stored in the look-up table to determine the waveforms supplied to the nozzles and transmitting the electronic waveforms to the nozzles to eject the ink droplets by controlling the number of pulses in each waveform, so that the at least one nozzle produces ink droplets each of nominal volume; and (h) operating an electromechanical transducer in the at least one nozzle, the electromechanical transducer being responsive to the waveform for ejecting the ink droplet from the nozzle.

13. The method of claim 12 and wherein the look-up table provides for each of plural droplet volumes a printing parameter to be recorded by the at least one nozzle.

14. The method of claim 13 and wherein in addition to number of pulses the printing parameter in the look-up table includes at least one other from the group consisting of printing start time after a start of line printing time, pulse-width, voltage pulse amplitude, and delay time interval between pulses.

15. The method of claim 14 and wherein the transducer is a piezoelectric transducer.

16. The method of claim 13 and wherein the transducer is a piezoelectric transducer.

17. The method of claim 12 and wherein the transducer is a piezoelectric transducer.

* * * * *